US012345532B2

(12) United States Patent
Sharma et al.

(10) Patent No.: US 12,345,532 B2
(45) Date of Patent: Jul. 1, 2025

(54) CREATING A TIME BOUNDED AND GOAL DRIVEN NETWORK FOR PASSENGER GUIDANCE

(71) Applicant: INTERNATIONAL BUSINESS MACHINES CORPORATION, Armonk, NY (US)

(72) Inventors: Nitika Sharma, Zirakpur (IN); Akash U. Dhoot, Pune (IN); Venkata Vara Prasad Karri, Visakhapatnam (IN); Saraswathi Sailaja Perumalla, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 17/651,458

(22) Filed: Feb. 17, 2022

(65) Prior Publication Data

US 2023/0258460 A1    Aug. 17, 2023

(51) Int. Cl.
*G01C 21/34* (2006.01)
*G01C 21/36* (2006.01)

(52) U.S. Cl.
CPC ..... *G01C 21/3415* (2013.01); *G01C 21/3484* (2013.01); *G01C 21/3492* (2013.01); *G01C 21/3614* (2013.01)

(58) Field of Classification Search
CPC ............ G01C 21/3415; G01C 21/3484; G01C 21/3492; G01C 21/3614
See application file for complete search history.

(56) References Cited

U.S. PATENT DOCUMENTS

| 9,574,888 | B1 * | 2/2017 | Hu | G01C 21/3484 |
| 10,859,382 | B1 * | 12/2020 | Swidersky | G01C 21/206 |
| 2015/0253144 | A1 | 9/2015 | Rau | |
| 2017/0314939 | A1 * | 11/2017 | Carter | G01C 21/3492 |
| 2018/0299272 | A1 * | 10/2018 | Salowitz | G06T 11/00 |
| 2018/0330294 | A1 * | 11/2018 | Anderson | G01C 21/3415 |

(Continued)

FOREIGN PATENT DOCUMENTS

WO    WO-2017030366 A1 *   2/2017   ............ G01C 21/20

OTHER PUBLICATIONS

Disclosed Anonymously, "Method and System for Performing Optimal Route Calculation Infused with Crowdsourced Contextual Mining", https://priorart.ip.com/IPCOM/000257844, IPCOM000257844D, Mar. 14, 2019, pp. 1-3.

(Continued)

*Primary Examiner* — Anne Marie Antonucci
*Assistant Examiner* — Misa H Nguyen
(74) *Attorney, Agent, or Firm* — Michael O'Keefe

(57) ABSTRACT

According to one embodiment, a method, computer system, and computer program product for contextual route guidance is provided. The embodiment may include receiving user information related to a current travel route. The embodiment may further include identifying current status information associated with a transportation hub through IoT-collected data. The embodiment may also include generating a navigation path for a user to reach a destination within the transportation hub based on the received user information and the identified current status information. The embodiment may further include presenting the navigation path to the user.

17 Claims, 5 Drawing Sheets

(56) References Cited

U.S. PATENT DOCUMENTS

2018/0330307 A1\* 11/2018 Anderson ...... G06Q 10/063116
2023/0154327 A1\* 5/2023 Huang ................ G08G 1/0133
701/423

OTHER PUBLICATIONS

Disclosed Anonymously, "Personal Navigation System for Public Transportation", https://priorart.ip.com/IPCOM/000194531, IPCOM000194531D, Mar. 29, 2010, pp. 1-3.

Disclosed Anonymously, "Real-time Intelligent Recommendation for Public Transportation Routes", https://priorart.ip.com/IPCOM/000220606, IPCOM000220606D, Aug. 9, 2012, pp. 1-6.

Disclosed Anonymously, "System and Method for Suggestions During Navigation Spare Time", https://priorart.ip.com/IPCOM/000253243, IPCOM000253243D, Mar. 16, 2018, pp. 1-4.

IBM, "Advanced digital manufacturing technology solutions", Digital manufacturing solutions—India | IBM, https://www.ibm.com/in-en/industries/manufacturing, Accessed on Dec. 9, 2021, pp. 1-8.

I-Scoop, "Industry 4.0 and the fourth industrial revolution explained", https://www.i-scoop.eu/industry-4-0/, Accessed Dec. 9, 2021, pp. 1-87.

Mell et al., "The NIST Definition of Cloud Computing", National Institute of Standards and Technology, Special Publication 800-145, Sep. 2011, 7 pages.

Shukla, "Industry 4.0 Solutions For New-Age Railways And Airways", https://www.electronicsforu.com/technology-trends/tech-focus/industry-4-solutions-railways-airways, Jan. 6, 2021, pp. 1-16.

Stoller, "One Of Every Seven Travelers Have Recently Missed A Flight Because of Long Airport Security Lines", https://www.forbes.com/sites/garystoller/2018/06/26/one-of-every-seven-travelers-miss-their-flights-because-of-long-airport-security-lines/#5221a0512e1d, Forbes, Jun. 26, 2018. pp. 1-4.

\* cited by examiner

CREATING A TIME BOUNDED AND GOAL DRIVEN NETWORK FOR PASSENGER GUIDANCE

BACKGROUND

The present invention relates generally to the field of computing, and more particularly to the Internet of Things (IoT).

Industry 4.0, also referred to as the fourth industrial revolution, relates to the trend of emergent technologies that connect various entities together through communication networks. Characterized by the digital transformation of the industries encompassing and surrounding manufacturing and production, Industry 4.0 includes, but is not limited to, the fields of autonomous machines, advanced robotics, big data and analytics, IoT, digital ubiquity, cloud infrastructures, smart factories, machine learning, artificial technology, and cyber-physical systems.

As a subset of Industry 4.0, IoT relates to an interrelated system of objects that are capable of transferring data across a network without requiring human participation. Currently, many devices available in the consumer marketplace are equipped with "smart" capabilities which include the capability to connect to a network through wired or wireless connections. These devices include many items from smartphones and wearables to refrigerators, lightbulbs, and vehicles.

SUMMARY

According to one embodiment, a method, computer system, and computer program product for contextual route guidance is provided. The embodiment may include receiving user information related to a current travel route. The embodiment may further include identifying current status information associated with a transportation hub through IoT-collected data. The embodiment may also include generating a navigation path for a user to reach a destination within the transportation hub based on the received user information and the identified current status information. The embodiment may further include presenting the navigation path to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
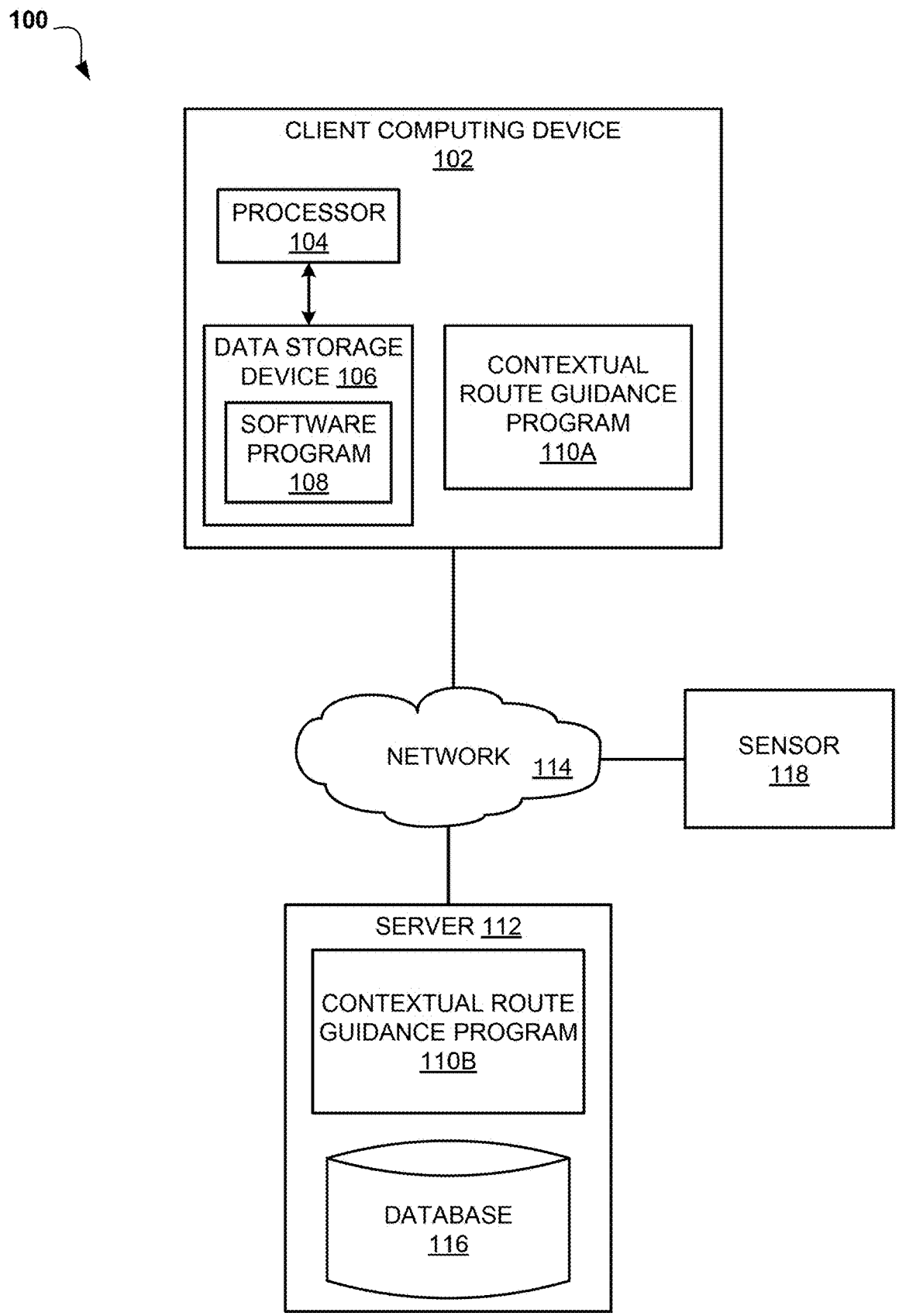
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to the Internet of Things (IoT). The following described exemplary embodiments provide a system, method, and program product to, among other things, generate a dynamic, time-bound and goal-oriented network within a transportation hub for individuals to reach a destination. Therefore, the present embodiment has the capacity to improve the technical field of IoT by utilizing data gathered by distributed IoT sensors and devices to generate an optimal and dynamic user path to a transportation hub destination.

As previously described, Industry 4.0, also referred to as the fourth industrial revolution, relates to the trend of emergent technologies that connect various entities together through communication networks. Characterized by the digital transformation of the industries encompassing and surrounding manufacturing and production, Industry 4.0 includes, but is not limited to, the fields of autonomous machines, advanced robotics, big data and analytics, the Internet of Things (IoT), digital ubiquity, cloud infrastructures, smart factories, machine learning, artificial technology, and cyber-physical systems.

As a subset of Industry 4.0, IoT relates to an interrelated system of objects that are capable of transferring data across a network without requiring human participation. Currently, many devices available in the consumer marketplace are equipped with "smart" capabilities which include the capability to connect to a network through wired or wireless connections. These devices include many items from smartphones and wearables to refrigerators, lightbulbs, and vehicles.

Relevant as a subset of Industry 4.0 and IoT, route tracking relates to the utilization of current situational information, such as weather/environmental conditions or traffic data, captured through various sensors to determine an individual or entity's current location and calculate a traversal route towards a destination. Route tracking may be a vital tool in various navigational circumstances, such as aiding individuals in high traffic or unfamiliar locations. For example, some individuals visit transportation hubs, such as airports, train stations, or bus terminals, during the course of travel. Traversal through the transportation hub may be difficult or daunting due to an individual traveling through the transportation hub infrequently or being a first time visitor to the transportation hub and thereby not being aware of locations and destinations within the transportation hub. Due to these elements, individuals may become frustrated or disappointed in being able to locate their destination which may result in travel delays. If the individual encounters enough delays or has too little time between arrival at the transportation hub and departure of their transportation (e.g., train, plane, bus, etc.), the individual may miss their scheduled transport.

Currently, many transportation hubs utilize various systems to aid individuals in navigating to their destination within a transportation hub, such as an announcement system or in-person passenger assistance. For example, before a flight concludes the final boarding process, an announcement is made to the general terminal instructing any missing passengers to quickly make their way to the departure gate. Similarly, if an individual has arrived late at an airport and will likely miss their flight without assistance, an airport employee may assist them through airport security and direct them to their flight's gate. Despite these solutions, many individuals continue to miss their scheduled transportation departures due to navigational issues inside the transportation hub and are forced to reschedule their transportation. As such, it may be advantageous to, among other things, develop a dynamic, time-bound and goal-oriented system to assist transportation hub passengers to their destination within the transportation hub through IoT- and AI-enabled communication and networking techniques.

According to at least one embodiment, the optimal passenger path from a current location to a destination within a carrier transportation hub may be determined using an intelligent AI-infused, context route guide that considers various input parameters such as, but not limited to, an individual's current location, travel details, health conditions, total number of bagged carried, types of baggage, number of co-travelers, and co-travelers health conditions. Real-time environmental data within and surrounding the transportation hub, such as arriving carrier vehicles, foot traffic, and current weather conditions, may be ingested through distributed sensors, such as installed cameras and foot traffic counters, and used to train an AI-model capable of calculating the optimal route. Furthermore, the calculated route may be dynamically updated based on changing conditions within the transportation hub or surrounding the individual traveler's circumstances.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to generate intelligent, AI-infused context guidance for an individual traversing through a transportation hub using IoT and AI-enabled communication and networking techniques.

Referring to FIG. 1, an exemplary networked computer environment 100 is depicted, according to at least one embodiment. The networked computer environment 100 may include client computing device 102, a server 112, and one or more sensors 118 interconnected via a communication network 114. According to at least one implementation, the networked computer environment 100 may include a plurality of client computing devices 102, servers 112, and sensors 118, of which only one of each is shown for illustrative brevity. Additionally, in one or more embodiments, the client computing device 102 and server 112 may each individually host a contextual route guidance program 110A, 110B. In one or more other embodiments, the contextual route guidance program 110A, 110B may be partially hosted on both the client computing device 102 and the server 112 so that functionality may be separated between the devices.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a contextual route guidance program 110A, receive data from one or more sensors, such as sensor 118, and communicate with the server 112 via the communication network 114, in accordance with one embodiment of the invention. In one or more other embodiments, client computing device 102 may be, for example, a mobile device, a telephone, a personal digital assistant, a netbook, a laptop computer, a tablet computer, a desktop computer, or any type of computing device capable of running a program and accessing a network. As previously described, one client computing device 102 is depicted in FIG. 1 for illustrative purposes, however, any number of client computing devices 102 may be utilized. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a contextual route guidance program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, sensor 118 may include location tracking devices capable of identifying, after a user opt-in process, the location of a user, the number of individuals in an area, foot traffic through a preconfigured space, a number and type of baggage items carried by a user, a number of individuals in a travel party, environmental data (e.g., time of date, weather conditions, etc.), and individual biometric characteristics (e.g., age, weight, heart rate, stress level, perspiration level, etc.). Sensor 118 may include a global positioning system (GPS) device, a Bluetooth-enabled device, Wifi-enabled device, a cellular communication device, a fitness tracking device, or any other location tracking device or data capture device capable of being affixed to an area of a transportation hub or worn by a user. In at least one embodiment, the sensor 118 may be capable of transmitting captured location tracking information to the client computing device 102 and the server 112 via communication network 114. A single sensor 118 is depicted in FIG. 1 for illustrative purposes, however, any number of sensors 118 may be utilized.

According to another embodiment, one or more sensors 118 may also be capable of image capture capabilities, such as video or image capture. When representing a video capture device (e.g., a camera), the one or more sensors 118 may be affixed to stationary objects, such as a structural pillar or a wall, within or nearby the transportation hub. In at least one embodiment, the sensor 118 may be capable of changing the angle and position at which images are captured. Furthermore, the sensor 118 may be capable of photographic analysis, such as image recognition, to perform certain tasks, such as foot traffic in a preconfigured area or a tally of current occupancy. In at least one embodiment, the sensor 120 may be capable of transmitting captured images or videos to the client computing device 102 and the server 112 via communication network 114.

According to the present embodiment, the contextual route guidance program 110A, 110B may be capable of receiving data related to one or more individuals within a transportation hub captured by one or more sensors, such as sensor 118. The contextual route guidance program 110A, 110B may generate an artificial intelligence model capable of processing the captured data to create an optimal travel path for each of the one or more individuals through the transportation hub that is contoured to the unique situation and circumstances of each individual given the characteristics and environmental conditions currently present within the transportation hub. The contextual route guidance method is explained in further detail below with respect to FIG. 2.

Figure 2:
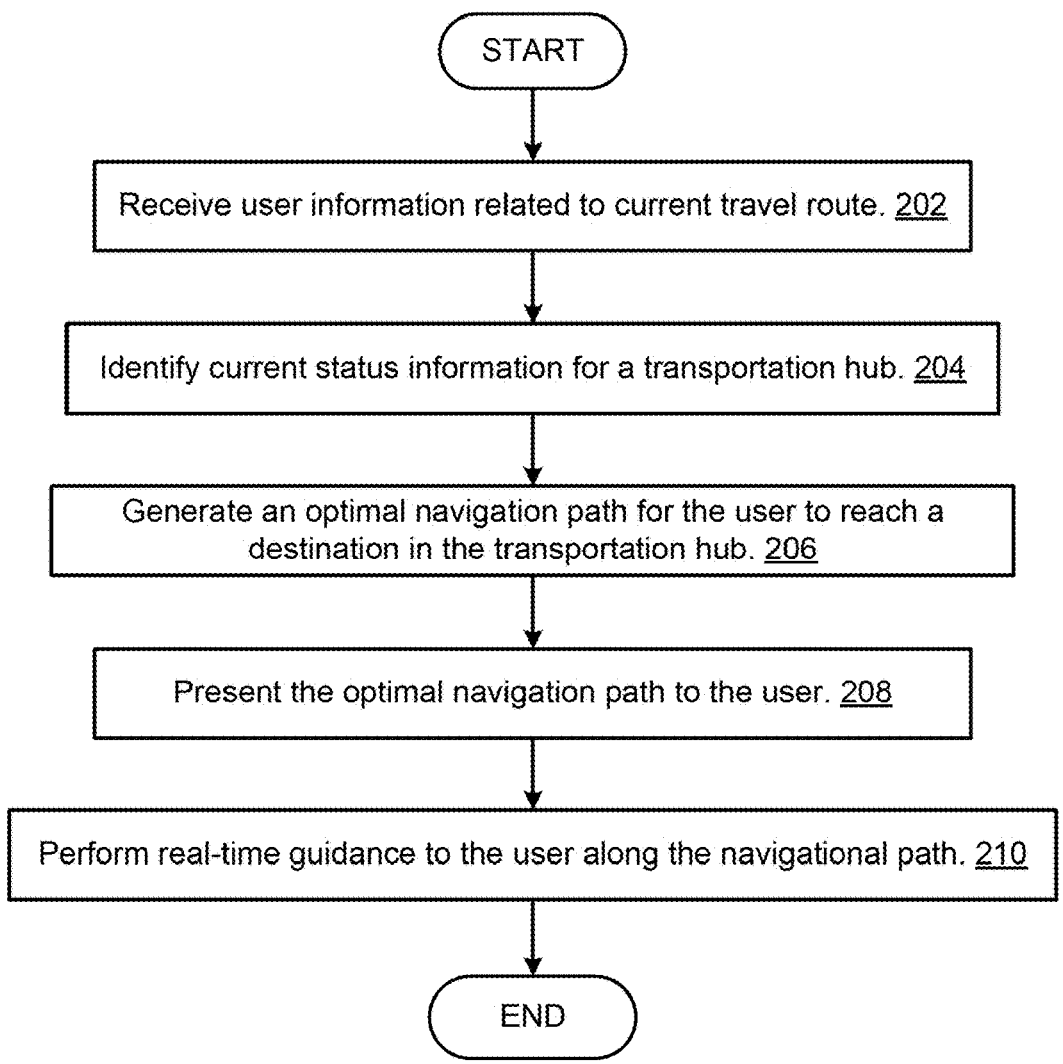
FIG. 2 illustrates an operational flowchart for a contextual route guidance process according to at least one embodiment.

Referring now to FIG. 2, an operational flowchart illustrating a contextual route guidance process 200 is depicted according to at least one embodiment. At 202, the contextual route guidance program 110A, 110B receives user information related to a current travel route. Upon a user arriving at a transportation hub or initiating that the contextual route guidance program 110A, 110B begin guidance, the contextual route guidance program 110A, 110B may begin gathering various items of information to assist in calculating an optimal route for the user to traverse to a travel destination, such as a transportation hub departure gate. Capturing the user travel information may include the contextual route guidance program 110A, 110B gathering information stored within a repository, such as database 116, a third party server, such as server 120. For example, a user seeking a navigational route to an airport departure gate may have travel information stored in an airline carrier database that the contextual route guidance program 110A, 110B may connect to through an application programming interface (API).

Additionally, as previously described, the contextual route guidance program 110A, 110B may utilize one or more sensors, such as sensor 118, to capture various information related to a transportation hub, individuals within the transportation hub, and a user. Also as previously described, the sensor may be capable of one or more of photographic capture capabilities, location tracking capabilities, and biometric data capture capabilities. For example, the sensor 118 may capture a user current location, user travel details, a user health condition, a number and type of baggage carried by the user, a number of travel partners accompanying the user, and characteristics associated with each travel partner. In at least one embodiment, each user and/or travel partner may be required to opt in to the collection of data in order to utilize the features of the contextual route guidance program 110A, 110B.

The sensor 118, or contextual route guidance program 110A, 110B itself, may identify the user current location through known location tracking technologies such cellular triangulation through a user device, such as client computing device 102, a global positioning system (GPS), or an indoor positioning system.

The contextual route guidance program 110A, 110B may also be capable of analyzing biometric information transferred from a user device, such as a fitness tracker or a smartphone, to determine various health-related information associated with the user, such as heart rate, perspiration rate, and stress level. Similarly, the contextual route guidance program 110A, 110B may be capable of communicatively connecting to or receiving information from a health app or a third party database containing vital health information related to the user. For example, the user may opt in to share health information important to calculating a navigation route for the user in a third party application that can communicate with the contextual route guidance program 110A, 110B. Similarly, the contextual route guidance program 110A, 110B may identify from an airline passenger database that the user requires a wheelchair and certain navigational routes in the transportation hub, such as staircases and escalators, are impassable for the user.

In at least one embodiment, the contextual route guidance program 110A, 110B may be capable of identifying the various user information, such as user departure gate number, a user departure time from the transportation hub, number and type of baggage, user third party affiliations, travel partners, and travel partner characteristics through third party repositories, such as database 116. For example, the contextual route guidance program 110A, 110B may search an airline database to identify that a specific user is travelling with a spouse and two children and each individual in the travel party possesses one carryon bag.

In at least one other embodiment, the contextual route guidance program 110A, 110B may determine the user has arrived at the transportation hub when the user comes within a preconfigured distance of the transportation hub as determined by a location sensor within a user device, such as client computing device 102. For example, if a user comes within 1000 feet of an airport passenger arrival area, the contextual route guidance program 110A, 110B may begin capturing user information useful for calculating the optimal travel route. In at least one further embodiment, the contextual route guidance program 110A, 110B may determine the user has arrived at the transportation hub when a personal user device has connected to a public communication network, such as network 114.

In yet a further embodiment, the contextual route guidance program 110A, 110B may begin calculating a navigational route before the user embarks toward the transportation hub. For example, if the user is still in a residence, the contextual route guidance program 110A, 110B may calculate a navigational route from the residence to the transportation hub and then through the transportation hub to the destination gate to aide the user in determining a total travel time.

Then, at 204, the contextual route guidance program 110A, 110B identifies a current status information for the transportation hub. Once the contextual route guidance program 110A, 110B determines the user has arrived or is arriving at the transportation hub and has gathered, or is in the process of gathering, the user information related to the user travel route, the contextual route guidance program 110A, 110B may identify elements related to the current transportation hub status, such as, but not limited to, carrier details, carrier delays, special support required by the user, available special support provided by the transportation hub or a carrier, transportation hub layout, current transportation hub occupancy, current transportation hub delays and wait times, and carrier arrival and departure times and locations. For example, upon a user device connecting to an airport public WiFi network, the contextual route guidance program 110A, 110B may identify the user flight information, such as departure time, airline carrier, and departure gate; wait times for a baggage check counter, boarding pass printing machine, commercial outlets, restrooms, and security check for a terminal associated with the airline carrier; and foot traffic congestion throughout the airport.

In at least one embodiment, the contextual route guidance program 110A, 110B may utilize transportation arrivals and departures, and the associated times and locations of the arrivals and departures, within the transportation hub since temporary spikes in congestion around the location of arrivals and departures may take place for a period of time around those locations that may impact users traversing through those locations.

Then, at 206, the contextual route guidance program 110A, 110B generates an optimal navigation path for the user to reach a destination in the transportation hub. The contextual route guidance program 110A, 110B may utilize the received user information and the gathered transportation hub status as inputs for an AI model that generates the optimal navigation path for the user to the destination. For example, the contextual route guidance program 110A, 110B may generate a navigational path that directs the use, upon entering the transportation hub, to proceed to a specific boarding pass counter with the shortest or fastest moving queue, then to a boarding area for the soonest arriving tram to the terminal in which the gate for the user's transport will board, then to a restroom which was most recently cleaned by a custodian, then to a café with the shortest line that serves the user's favorite beverage and/or snack food, and finally to the user's departure gate. Furthermore, the contextual route guidance program 110A, 110B may allow the user to customize the navigational route based on a variety of user-selected factors, such as shortest distance to destination, fastest travel time to destination, walking only, avoid elevators, avoid enclosed spaces, avoid high traffic areas, etc. In at least one embodiment, the contextual route guidance program 110A, 110B may automatically customize the navigational route to the user's abilities according to user-preconfigured options. For example, if the user requires the usage of a wheelchair, the contextual route guidance program 110A, 110B may identify such usage through preconfiguration and generate a navigational route that is only accessible with a wheelchair.

In at least one embodiment, the contextual route guidance program 110A, 110B may identify conditions that need to be met for the user to reach the destination if there is a constraint present. For example, if the user is late to the airport for a flight, the contextual route guidance program 110A, 110B may instruct the user to run to the destination in order to arrive in time for the flight.

In at least one other embodiment, the contextual route guidance program 110A, 110B may connect one or more third party software programs, such as software program 108, that may track a plurality of user product wish lists and integrate this information into the navigational route. For example, if the user arrives at the transportation hub ahead of the designated departure time, the contextual route guidance program 110A, 110B may identify, through a wish list on a connected third party software program, that a nearby shop has a book the user wishes to read and suggest a deviation from the original navigation path to the identified shop to purchase the book. Similarly, the contextual route guidance program 110A, 110B may identify that the user "liked" a specific food item on a social media feed and that a restaurant inside or nearby the transportation hub serves the "liked" food item. After user approval, the contextual route guidance program 110A, 110B may update the navigation route to the identified restaurant so the user may purchase the food item.

Next, at 208, the contextual route guidance program 110A, 110B presents the optimal navigation path to the user. The contextual route guidance program 110A, 110B may present one or more navigation paths to the user on a display screen or graphical user interface of the user device and allow the user to select the preferred path. The contextual route guidance program 110A, 110B may tag one or more paths presented to user to aid in user selection. The tags may include, but are not limited to, shortest distance to destination, fastest travel time to destination, walking only, shortest time standing in lines, avoids stairs, avoids enclosed spaces, avoids high traffic areas, and avoids commercial establishments.

In at least one embodiment, the contextual route guidance program 110A, 110B may calculate an approximate time taken to arrive at the destination location that takes into account all formalities required by the transportation hub based on the transportation hub status and the user travel information. For example, if the user has luggage to check and is travelling with three other individuals while also requiring stops at a restroom and a café, the contextual route guidance program 110A, 110B may determine that, due to current queuing times, the user may require one hour to reach the destination. In at least one other embodiment, the contextual route guidance program 110A, 110B may generate and display the approximate time of each segment of the navigational route on the display screen or graphical user interface juxtaposed to each segment.

Then, at 210, the contextual route guidance program 110A, 110B may perform real-time guidance to the user along the navigation path. Once the contextual route guidance program 110A, 110B has generated the optimal navigation path, the contextual route guidance program 110A, 110B may present and guide the user along the path through various visual or audial methods. For example, the contextual route guidance program 110A, 110B may utilize augmented reality (AR) or virtual reality (VR) capabilities of a user device, such as client computing device to navigate the user visually through the transportation hub. Similarly, the contextual route guidance program 110A, 110B may utilize audio cues presented to the user through a speaker or a pair of headphones connected to a user device to instruct the user a direction in which to travel or an instrumentality to use when following the navigation. For example, an audio cue may instruct the user to take an escalator instead of stairs if the user is carrying a heavy bag and walking a set of stair with a heavy item would slow the user down. Additionally, the contextual route guidance program 110A, 110B may utilize location tracking technologies to monitor the user's location along the navigational route. For example, the contextual route guidance program 110A, 110B may ingest or mark the user's latitudinal and longitudinal location, which may aide in tracking the users surroundings and suggest effective updates to the navigational route.

With respect to AR and VR capabilities, the contextual route guidance program 110A, 110B may display visual cues through a display screen and/or a graphical user interface of a user device. For example, if the user is instructed to take a certain path in an intersection of the transportation hub, the contextual route guidance program 110A, 110B may display a visual indictor, such as an arrow, pointing to the specific path with which the user should take that is dynamically updated when the user moves the user device so that the visual indicator remains pointing at the destination path. Such capabilities may be accomplished through embedded camera(s), gyroscope(s), and/or accelerometer(s) within the user device.

In at least one embodiment, the contextual route guidance program 110A, 110B may monitor the user travel information and the transportation hub status in real time to determine if any changes that affect the navigational route or the time to reach the destination occur. For example, if a flight arrives in an airport terminal along the original navigational route that causes foot traffic congestion, the contextual route guidance program 110A, 110B may update the navigational route to avoid the increased foot traffic since it may delay the user from getting to the destination. The updated navigational route may not only alter the path the user may take but also a pace at which the user must proceed in order to reach the destination by a certain time.

Similarly, if a user experiences a delay to the travel schedule, such as due to a transport technical issue, the contextual route guidance program 110A, 110B may utilize IoT devices around the transportation hub to monitor the technical issue, notify the user of the anticipated delay, and suggest a detour destination, such as a café or restaurant, for the user to visit until the technical issue is resolved. In at least one embodiment, the contextual route guidance program 110A, 110B may estimate the anticipated delay based on historical data in a repository, such as database 116, in conjunction with or alternatively to the data obtained from distributed IoT devices within or around the transportation hub. The anticipated delay may be, but is not limited to, a technical issue with the transport vehicle (e.g., car, airplane, bus, etc.), a weather issue, a staffing issue (e.g., required pilot downtime), a delayed transport vehicle, transport traffic delays, or any other type of delay that may impede the transport from departing at the originally scheduled time.

In at least one other embodiment, the contextual route guidance program 110A, 110B may monitor the user's mode of traversal along the navigational route and make updates required by the user's change of transportation. For example, if the user proceeds along the navigational route through a city on foot but becomes tired and boards a bus, the contextual route guidance program 110A, 110B may recognize this change in mode of transportation due to location tracking, accelerometer and gyroscopic measurements taken from the user device, and/or manual user input to the contextual route guidance program 110A, 110B and adjust the navigational route accordingly.

In at least one further embodiment, the contextual route guidance program 110A, 110B may terminate once the user has reached the destination or is safely on board the transport.

It may be appreciated that FIG. 2 provides only an illustration of one implementation and does not imply any limitations with regard to how different embodiments may be implemented. Many modifications to the depicted environments may be made based on design and implementation requirements. For example, although the location discussed as an example throughout FIG. 2 refers to a transportation hub, the contextual route guidance program 110A, 110B may be utilized in any preconfigured space, such as a mall, grocery store, shopping center, city block, fair, festival, or other types of congregations.

In another embodiment, the contextual route guidance program 110A, 110B may be capable of calculating a navigational route through multiple transportation hubs encountered in a single travel route. For example, if a user is traveling through multiple transportation hubs due to a connecting carrier, the contextual route guidance program 110A, 110B may calculate a navigation route through all transportation hubs encountered at the time the user begins traversal of the first leg of the route based on the current status of the user travel information and the current status of each transportation hub.

Figure 3:
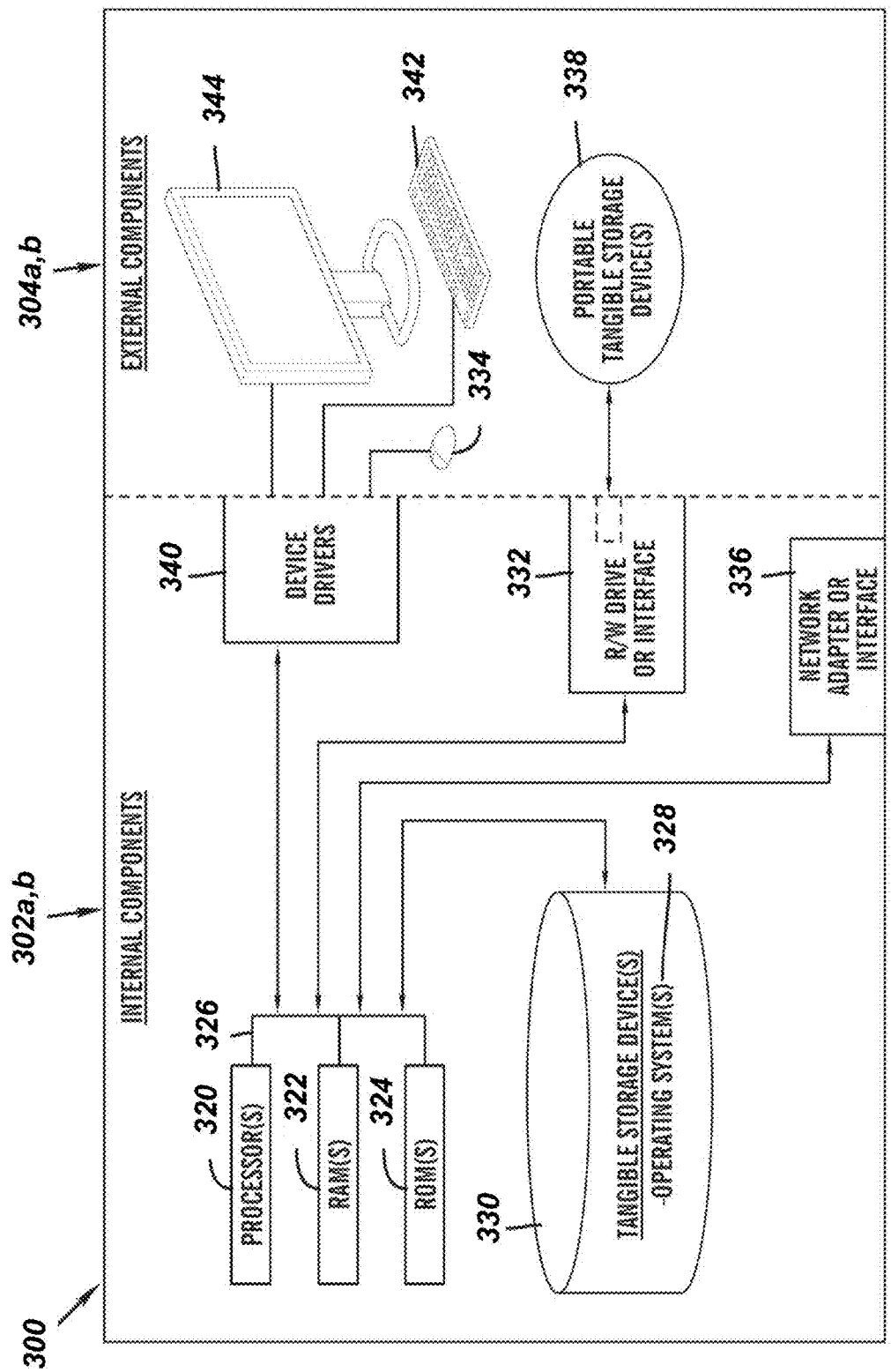
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302a,b and external components 304a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the contextual route guidance program 110A in the client computing device 102 and the contextual route guidance program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302a,b also includes a RAY drive or interface 332 to read from and write to one or more portable computer-readable tangible storage devices 338 such as a CD-ROM, DVD, memory stick, magnetic tape, magnetic disk, optical disk or semiconductor storage device. A software program, such as the contextual route guidance program 110A, 110B, can be stored on one or more of the respective portable computer-readable tangible storage devices 338, read via the respective RAY drive or interface 332, and loaded into the respective hard drive 330.

Each set of internal components 302a,b also includes network adapters or interfaces 336 such as a TCP/IP adapter cards, wireless Wi-Fi interface cards, or 3G or 4G wireless interface cards or other wired or wireless communication links. The software program 108 and the contextual route guidance program 110A in the client computing device 102 and the contextual route guidance program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the contextual route guidance program 110A in the client computing device 102 and the contextual route guidance program 110B in the server 112 are loaded into the respective hard drive 330. The network may comprise copper wires, optical fibers, wireless transmission, routers, firewalls, switches, gateway computers and/or edge servers.

Each of the sets of external components 304a,b can include a computer display monitor 344, a keyboard 342, and a computer mouse 334. External components 304a,b can also include touch screens, virtual keyboards, touch pads, pointing devices, and other human interface devices. Each of the sets of internal components 302a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
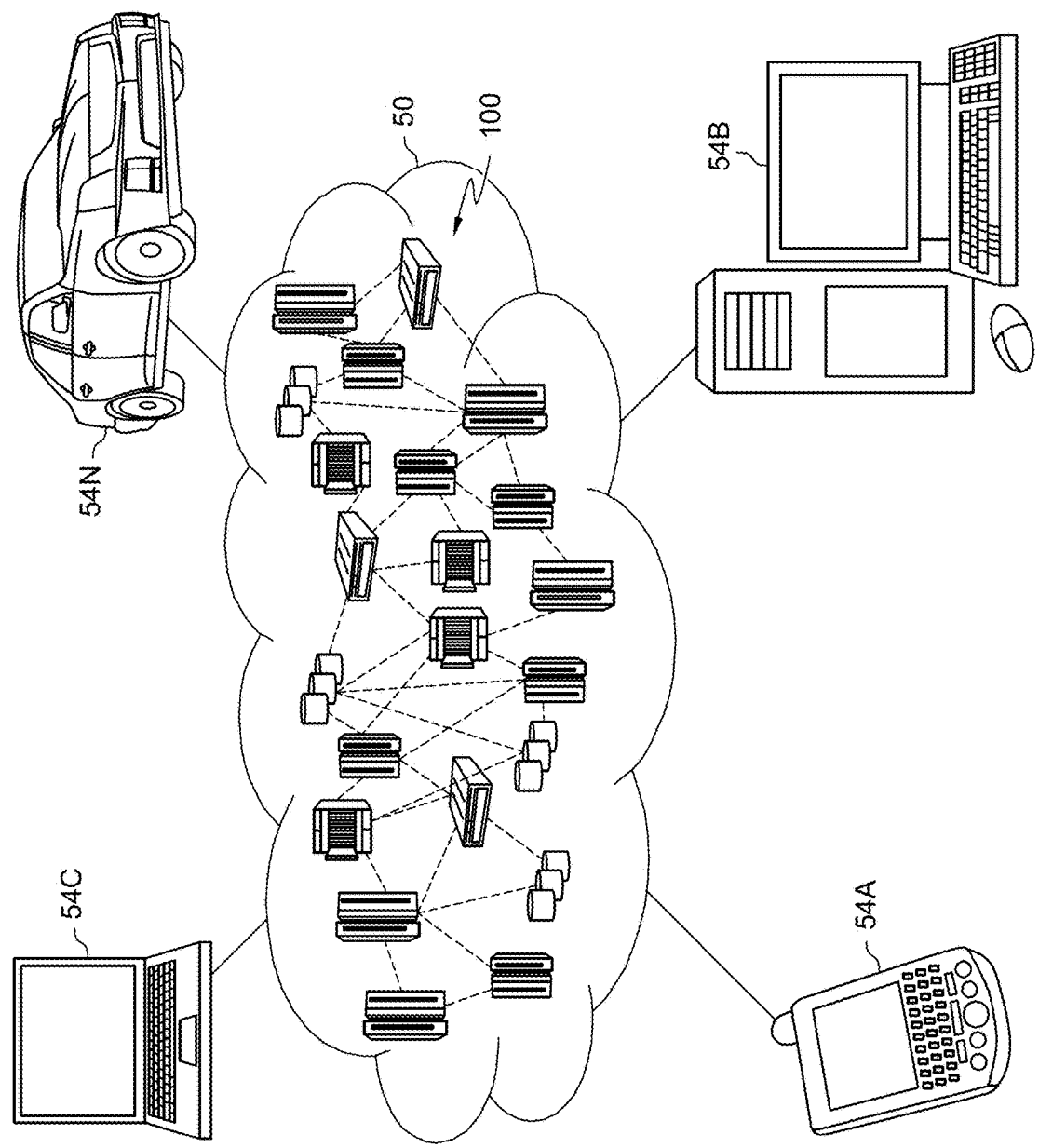
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
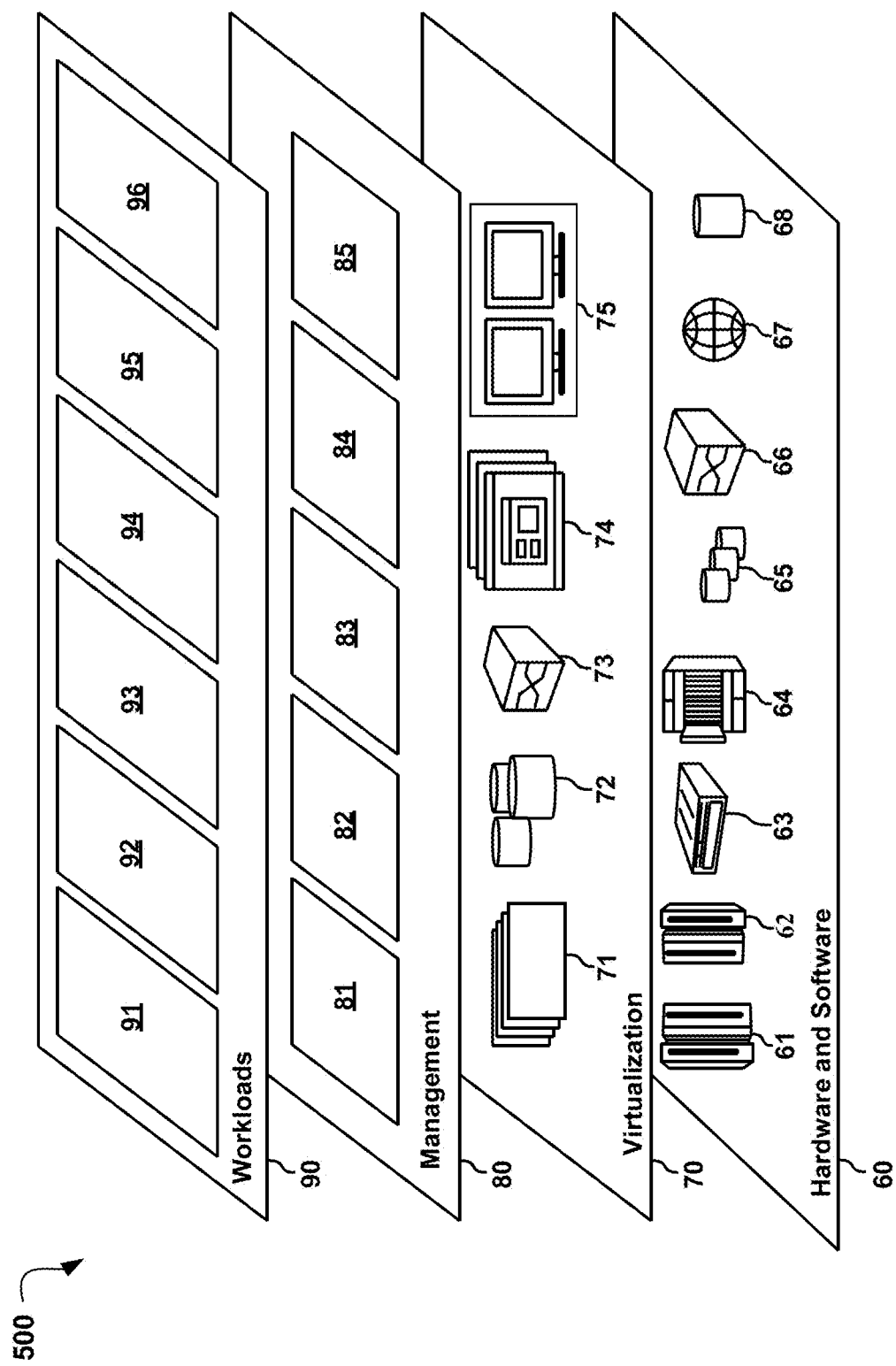
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and contextual route guidance 96. Contextual route guidance may relate to capturing user and environmental information relating to a transportation hub and generate an optimal navigation path, unique to the user, through the transportation hub.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
   receiving user information related to a current travel route;
   identifying current status information associated with a transportation hub through IoT-collected data;
   generating two or more navigation paths, concurrently, for a user from an arrival location to a destination within the transportation hub based on the received user information and the identified current status information, wherein a first navigation path within the two or more navigation paths satisfies a first factor within two or more factors and a second navigation path within the two or more navigation paths satisfies a second factor within the two or more factors, and wherein the two or more factors are selected from a group consisting of walking only, avoid elevators, avoid enclosed spaces, and avoid high traffic areas;
   calculating, and updating in real-time, a traversal time of the two or more navigation paths for the user to reach the destination and an arrival time at the destination;
   calculating, and updating in real-time, an approximate time to complete a plurality of segments of the two or more navigation paths to be encountered by the user along the two or more navigation paths based on the identified current status information, wherein a segment comprises a formality required for traversal of the transportation hub; and
   presenting, and updating in real-time, the two or more navigation paths and the traversal time, the arrival time, guidance to traverse each navigation path to the user, and the approximate time to complete each segment within the plurality of segments, wherein the guidance comprises displaying a visual cue on a graphical user interface of a user device directing the user to traverse a path within the transportation hub corresponding to a navigation path within the two or more navigation paths, and wherein the approximate time to complete each segment is displayed on the graphical user interface juxtaposed to each segment, and wherein the visual cue is an arrow pointing to a specific path with which the user is to take, and wherein the visual cue is dynamically updated when the user moves the user device so that the visual cue remains pointing at the path.

2. The method of claim 1, further comprising:
   receiving updated current status information associated with the transportation hub that impacts a criteria for the user to navigate the generated navigation path, wherein the criteria is selected from a group consisting of a temporal value, a spatial value, and a user-specified criteria;
   generating an updated navigation path that removes the criteria; and
   presenting the updated navigation path to the user.

3. The method of claim 1, wherein generating the navigation path further comprises including a constraint the user must satisfy in order to reach the destination by a required time.

4. The method of claim 1, wherein performing real-time guidance further comprises utilizing augmented reality or virtual reality capabilities of the user device to direct the user along the navigation path, wherein the user device comprises, embedded, a camera, a gyroscope, and an accelerometer.

5. The method of claim 1, wherein the user information is selected from a group consisting of a user current location, user travel details, a user health condition, a number and type of baggage carried by the user, a number of travel partners accompanying the user, and characteristics associated with each travel partner.

6. The method of claim 1, wherein current status information is selected from a group consisting of carrier delays, special support required by the user, current transportation hub occupancy, current transportation hub delays and wait times, and carrier arrival and departure times and locations.

7. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving user information related to a current travel route;
identifying current status information associated with a transportation hub through IoT-collected data;
generating two or more navigation paths, concurrently, for a user from an arrival location to a destination within the transportation hub based on the received user information and the identified current status information, wherein a first navigation path within the two or more navigation paths satisfies a first factor within two or more factors and a second navigation path within the two or more navigation paths satisfies a second factor within the two or more factors, and wherein the two or more factors are selected from a group consisting of walking only, avoid elevators, avoid enclosed spaces, and avoid high traffic areas;
calculating, and updating in real-time, a traversal time of the two or more navigation paths for the user to reach the destination and an arrival time at the destination;
calculating, and updating in real-time, an approximate time to complete a plurality of segments of the two or more navigation paths to be encountered by the user along the two or more navigation paths based on the identified current status information, wherein a segment comprises a formality required for traversal of the transportation hub; and
presenting, and updating in real-time, the two or more navigation paths and the traversal time, the arrival time, guidance to traverse each navigation path to the user, and the approximate time to complete each segment within the plurality of segments, wherein the guidance comprises displaying a visual cue on a graphical user interface of a user device directing the user to traverse a path within the transportation hub corresponding to a navigation path within the two or more navigation paths, and wherein the approximate time to complete each segment is displayed on the graphical user interface juxtaposed to each segment, and wherein the visual cue is an arrow pointing to a specific path with which the user is to take, and wherein the visual cue is dynamically updated when the user moves the user device so that the visual cue remains pointing at the path.

8. The computer system of claim 7, further comprising:
receiving updated current status information associated with the transportation hub that impacts a criteria for the user to navigate the generated navigation path, wherein the criteria is selected from a group consisting of a temporal value, a spatial value, and a user-specified criteria;
generating an updated navigation path that removes the criteria; and
presenting the updated navigation path to the user.

9. The computer system of claim 7, wherein generating the navigation path further comprises including a constraint the user must satisfy in order to reach the destination by a required time.

10. The computer system of claim 7, wherein performing real-time guidance further comprises utilizing augmented reality or virtual reality capabilities of the user device to direct the user along the navigation path, wherein the user device comprises, embedded, a camera, a gyroscope, and an accelerometer.

11. The computer system of claim 7, wherein the user information is selected from a group consisting of a user current location, user travel details, a user health condition, a number and type of baggage carried by the user, a number of travel partners accompanying the user, and characteristics associated with each travel partner.

12. The computer system of claim 7, wherein current status information is selected from a group consisting of carrier delays, special support required by the user, current transportation hub occupancy, current transportation hub delays and wait times, and carrier arrival and departure times and locations.

13. A computer program product, the computer program product comprising:
one or more computer-readable tangible storage medium and program instructions stored on at least one of the one or more tangible storage medium, the program instructions executable by a processor capable of performing a method, the method comprising:
receiving user information related to a current travel route;
identifying current status information associated with a transportation hub through IoT-collected data;
generating two or more navigation paths, concurrently, for a user from an arrival location to a destination within the transportation hub based on the received user information and the identified current status information, wherein a first navigation path within the two or more navigation paths satisfies a first factor within two or more factors and a second navigation path within the two or more navigation paths satisfies a second factor within the two or more factors, and wherein the two or more factors are selected from a group consisting of walking only, avoid elevators, avoid enclosed spaces, and avoid high traffic areas;
calculating, and updating in real-time, a traversal time of the two or more navigation paths for the user to reach the destination and an arrival time at the destination;
calculating, and updating in real-time, an approximate time to complete a plurality of segments of the two or more navigation paths to be encountered by the user along the two or more navigation paths based on the identified current status information, wherein a segment comprises a formality required for traversal of the transportation hub; and presenting, and updating in real-time, the two or more navigation paths and the traversal time, the arrival time, guidance to traverse each navigation path to the user, and the approximate time to complete each segment within the plurality of segments, wherein the guidance comprises displaying a visual cue on a graphical user interface of a user device directing the user to traverse a path within the transportation hub corresponding to a navigation path within the two or more navigation paths, and wherein the approximate time to complete each segment is displayed on the graphical user interface juxtaposed to each segment, and wherein the visual cue is an arrow pointing to a specific path with which the user is to take, and wherein the visual cue is dynamically updated when the user moves the user device so that the visual cue remains pointing at the path.

14. The computer program product of claim 13, further comprising:

receiving updated current status information associated with the transportation hub that impacts a criteria for the user to navigate the generated navigation path, wherein the criteria is selected from a group consisting of a temporal value, a spatial value, and a user-specified criteria;

generating an updated navigation path that removes the criteria; and presenting the updated navigation path to the user.

15. The computer program product of claim 13, wherein generating the navigation path further comprises including a constraint the user must satisfy in order to reach the destination by a required time.

16. The computer program product of claim 13, wherein performing real-time guidance further comprises utilizing augmented reality or virtual reality capabilities of the user device to direct the user along the navigation path, wherein the user device comprises, embedded, a camera, a gyroscope, and an accelerometer.

17. The computer program product of claim 13, wherein the user information is selected from a group consisting of a user current location, user travel details, a user health condition, a number and type of baggage carried by the user, a number of travel partners accompanying the user, and characteristics associated with each travel partner.

* * * * *